US012588647B1

(12) United States Patent

Shi

(10) Patent No.: US 12,588,647 B1

(45) Date of Patent: Mar. 31, 2026

(54) REMOVABLE MAGNETIC FILTER DEVICE FOR SMART CAT LITTER BOX

(71) Applicant: Huanhuan Shi, Guangdong (CN)

(72) Inventor: Huanhuan Shi, Guangdong (CN)

( * ) Notice: Subject to any disclaimer, the term of this patent is extended or adjusted under 35 U.S.C. 154(b) by 0 days.

(21) Appl. No.: 19/364,344

(22) Filed: Oct. 21, 2025

(51) Int. Cl.
  *A01K 1/01* (2006.01)

(52) U.S. Cl.
  CPC .................................. *A01K 1/0114* (2013.01)

(58) Field of Classification Search
  CPC ............................ A01K 1/0114; A01K 1/0116
  See application file for complete search history.

(56) References Cited

U.S. PATENT DOCUMENTS

| | | | |
|---|---|---|---|
| 12,225,877 B1 * | 2/2025 | Lin | A01K 1/01 |
| 2023/0363348 A1 * | 11/2023 | Pan | A01K 1/0114 |
| 2025/0169462 A1 * | 5/2025 | Tang | A01K 1/0114 |

* cited by examiner

*Primary Examiner* — Kristen C Hayes
(74) *Attorney, Agent, or Firm* — Hawaii Patent Services; Nathaniel K. Fedde; Kenton N. Fedde

(57) ABSTRACT

A removable magnetic filter device for a smart cat litter box, comprising: a housing; a chamber body arranged inside the housing and rotatably mounted on the housing; a baffle arranged within the chamber body, forming an accommodation cavity between the baffle and the inner wall of the chamber body; a filter screen rotatably mounted on the baffle; a first magnetic attachment component mounted on the baffle; and a second magnetic attachment component mounted on the filter screen. The first and second magnetic attachment components are magnetically attracted to each other.

20 Claims, 14 Drawing Sheets

400

600

500

100

300

200

404    406    403

407

408    402

409

405

400

408

406

409

405

403

409

405

704

705

706

100

703

707

400

701

700

102

100

REMOVABLE MAGNETIC FILTER DEVICE FOR SMART CAT LITTER BOX

TECHNICAL FIELD

The present disclosure relates to the technical field of pet supplies, particularly to a removable magnetic filter device for a smart cat litter box.

BACKGROUND

In the prior art, smart cat litter boxes mostly adopt a drum-type or flat-shovel structure to achieve automatic cleaning. The filter screen, as a core component for separating clumped and clean cat litter, often exists in the form of a strip or curved structure fixed to the inner wall of the drum in open rotating litter boxes, performing the sieving function as the drum rotates forward and backward. However, this filter screen structure has obvious defects: the integrated rigid design causes cat litter to easily get stuck horizontally in the filter pores when using long, large-particle, or plant-fiber-based cat litter (such as tofu litter or corn litter), leading to blockages. This not only prevents effective litter recycling but also results in some clean litter being wasted along with clumps, even affecting subsequent use. Moreover, due to significant variations in the length of cat litter particles across brands (some long-strip litter can exceed 20 mm in length), fixed filter screens are difficult to adapt, limiting product versatility. Additionally, once clogged, the filter screen requires manual disassembly and cleaning, which is cumbersome and degrades user experience.

For example, U.S. Patent US20240397904A1 discloses a waste treatment device that separates clean and soiled cat litter through a rotatable shell and filter element, aiming to improve waste management efficiency and user convenience while addressing inefficiencies in traditional pet cleaning processes. However, this device also employs an overall rigid filter structure, which still faces issues such as easy clogging, incomplete litter recycling, litter waste, and limited applicability when dealing with long, large-particle, or plant-fiber-based cat litter. Furthermore, cleaning after clogging still relies on manual operation, resulting in a poor user experience.

SUMMARY

The present disclosure provides a removable magnetic filter device for a smart cat litter box to solve the problems raised in the above background art.

To achieve the above-mentioned object, the present disclosure adopts the following technical solutions:

A removable magnetic filter device for smart cat litter box includes a housing; a chamber body arranged inside the housing and rotatably mounted on the housing; a baffle arranged within the chamber body, forming an accommodation cavity between the baffle and an inner wall of the chamber body; a filter screen rotatably mounted on the baffle; a first magnetic attachment component mounted on the baffle; and a second magnetic attachment component mounted on the filter screen, wherein the first and second magnetic attachment components are magnetically attracted to each other. When the chamber body rotates, cat litter pushes the filter screen to turn, enabling the second magnetic attachment component to adhere to the first magnetic attachment component to secure the filter screen, thereby blocking clumped cat litter and allowing clean cat litter to enter the accommodation cavity; and when the chamber body rotates in reverse, the cat litter pushes the filter screen to turn reversely, separating the second magnetic attachment component from the first magnetic attachment component, and the filter screen moves with the cat litter to avoid clogging.

A removable magnetic filter device for smart cat litter box includes a housing; a chamber body arranged inside the housing and rotatably mounted on the housing; a baffle arranged inside the chamber body, forming an accommodation cavity between the baffle and an inner wall of the chamber body; a filter screen rotatably mounted on the baffle; a first magnetic attachment component mounted on the baffle; a second magnetic attachment component mounted on the filter screen, wherein the first magnetic attachment component and the second magnetic attachment component are magnetically attracted to each other; and a rotating mechanism mounted inside the housing and connected to the chamber body for driving rotation of the chamber body. When the chamber body rotates, the cat litter pushes the filter screen to rotate, enabling the second magnetic attachment component to adhere to the first magnetic attachment component to secure the filter screen, thereby blocking clumped cat litter and allowing clean cat litter to enter the accommodation cavity; and when the chamber body rotates in reverse, the cat litter pushes the filter screen to turn reversely, separating the second magnetic attachment component from the first magnetic attachment component, allowing the filter screen to move with the cat litter to avoid clogging.

The beneficial effects of the present disclosure compared to the prior art are:

By automatically sensing the cat's departure and initiating the cleaning process, it achieves fully automated operation, significantly enhancing the convenience and hygiene of pet ownership. Its core innovation lies in the use of a dynamically fixed magnetic filter screen, which effectively separates and removes clumped waste during cleaning while avoiding material jams during reset, ensuring clean cat litter is evenly spread out. This addresses the pain points of traditional filter screens being prone to clogging and incomplete cleaning. Additionally, the device integrates a plurality of safety sensing systems such as weight, radar, and infrared, enabling real-time monitoring during operation to effectively prevent pets from being pinched or stuck, with particularly outstanding safety features. Moreover, its chamber body and filter screen are easy to disassemble and clean, truly delivering an exceptional user experience that combines intelligence, safety, efficiency, and ease of maintenance.

BRIEF DESCRIPTION OF DRAWINGS

The drawings, which form part of this application, are intended to provide further understanding of the present disclosure. The illustrative embodiments and the descriptions thereof are used to explain the present disclosure and do not constitute undue limitations thereof. In the drawings.

Figure 1:
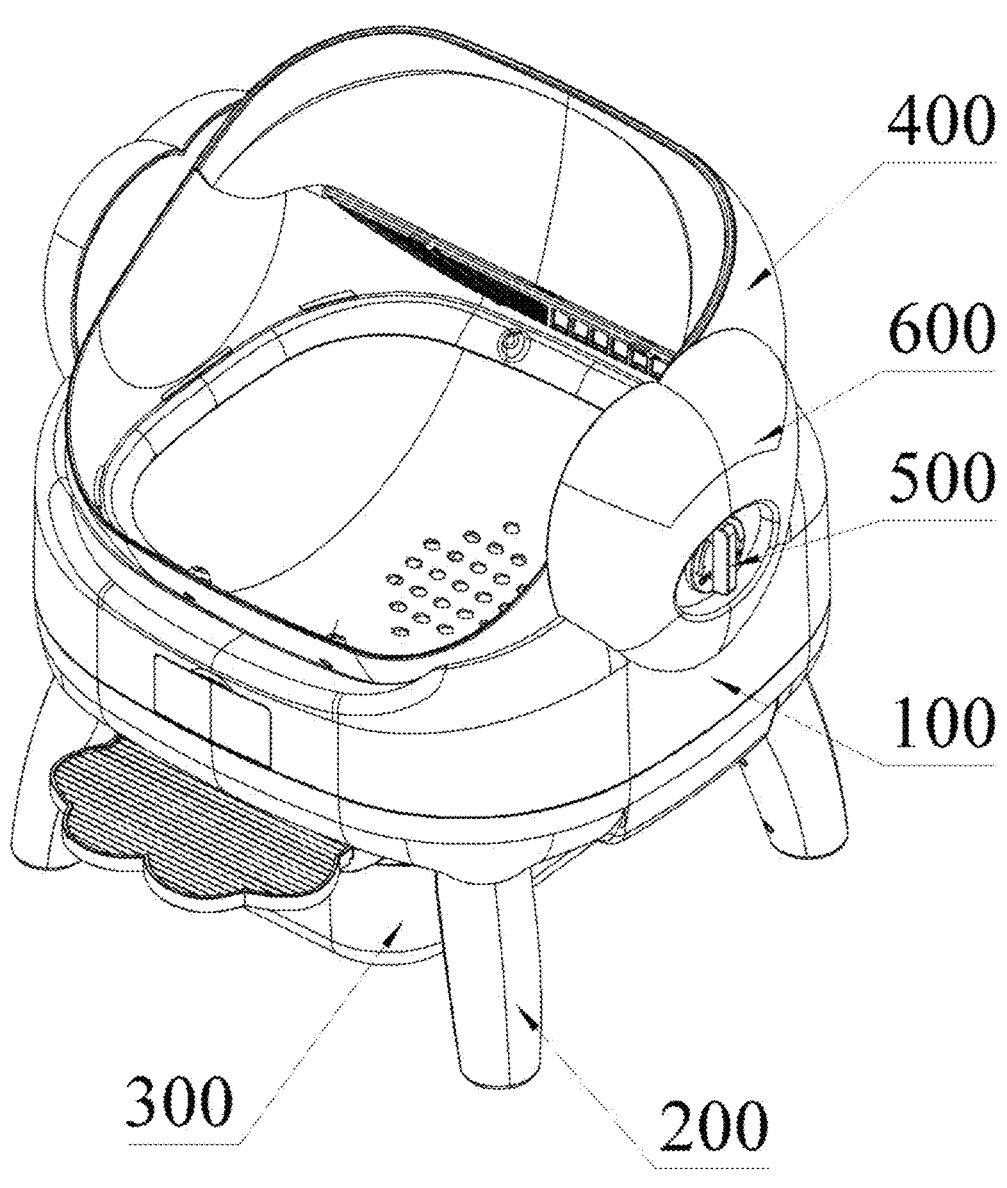
FIG. 1 is a perspective schematic diagram of an embodiment provided by the present disclosure.

Reference signs: Housing (100); Radar Sensor (101); Mounting Hole (102); Sliding Groove (103); Infrared Tube (104); First Hall Switch (105); Support Leg (200); Weight Sensor (201); Collection Box (300); Pulling Plate (301); Chamber Body (400); Through Hole (401); Mounting Rack (402); Rotating Rod (403); Clamping Hook (404); Filter Screen (405); Baffle (406); Accommodation Cavity (407); First Magnet (408); Second Magnet (409); Knob (500); Turntable (501); Connecting Rod (502); Clamping Block (503); Connecting Shell (600); Connecting Hole (601); Rotating Mechanism (700); Servo Motor (701); First Gear (702); Second Gear (703); Third Gear (704); Rotating Shaft (705); Angle Hall Plate (706); Support Frame (707); Transmission Box (708); N Pole (709); First S Pole (710); Second S Pole (711).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
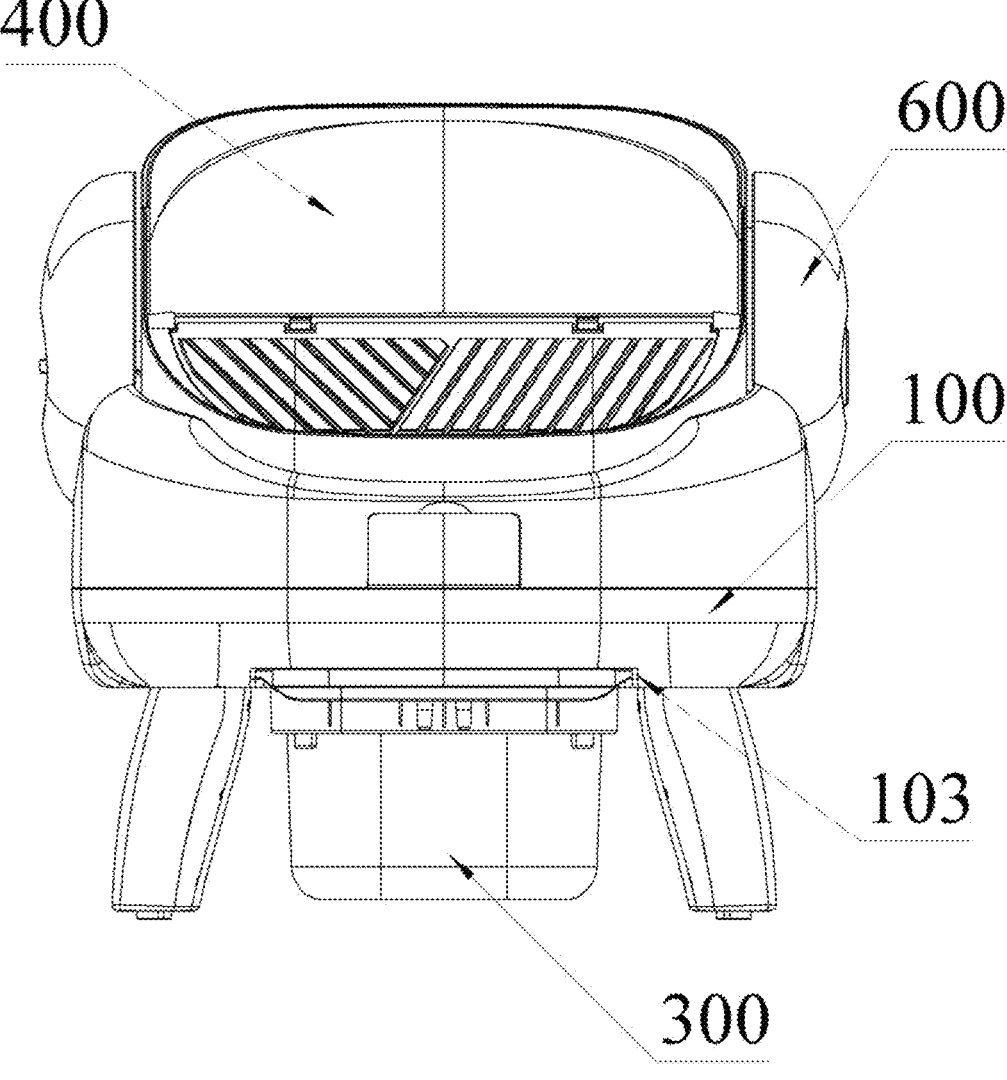
FIG. 2 is a front structural schematic diagram of FIG. 1.
Figure 7:
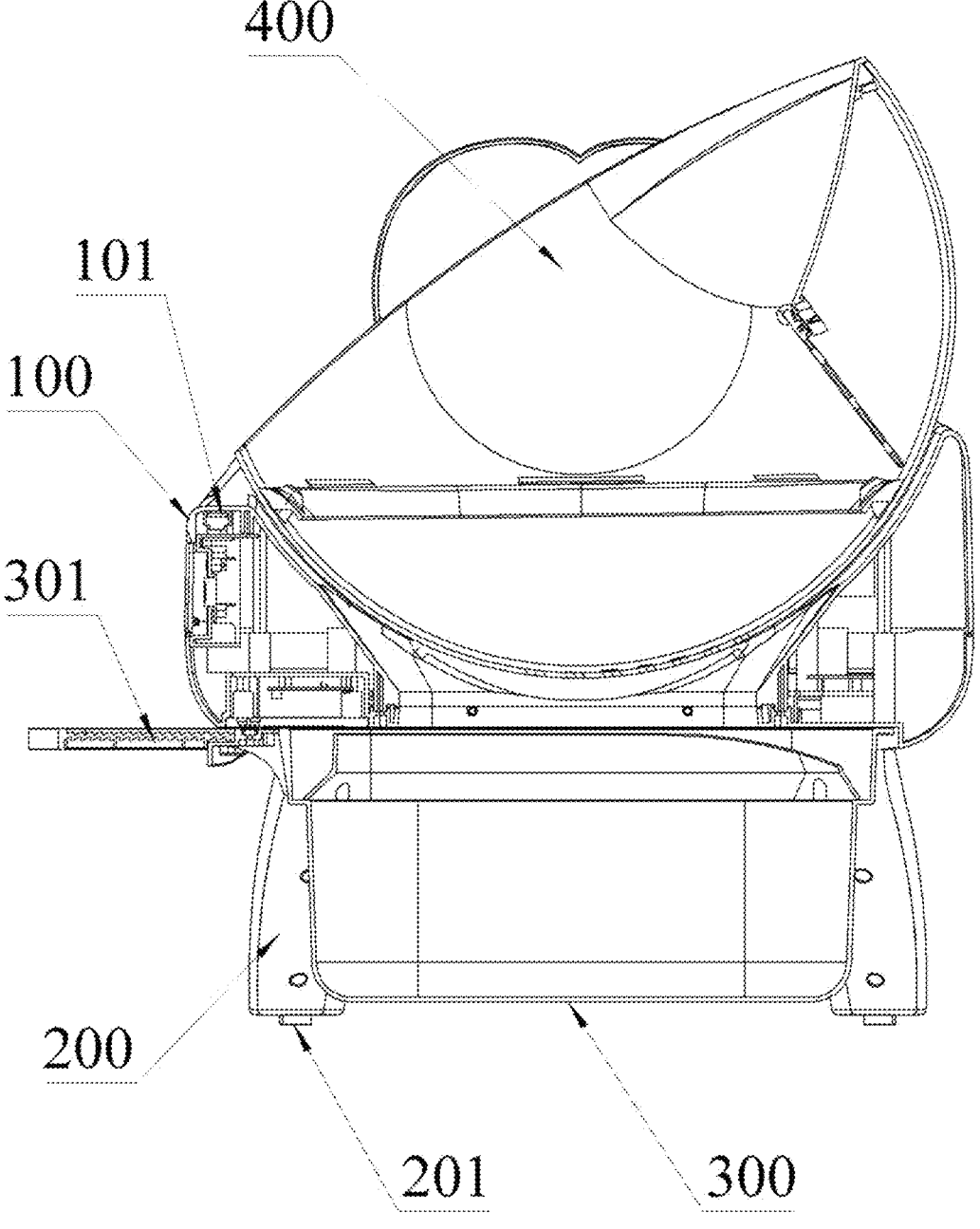
FIG. 7 is a cross-sectional structural schematic diagram of the embodiment shown in FIG. 1.

As shown in FIGS. 1, 2, and 7, a removable magnetic filter device for a smart cat litter box includes a housing 100, support legs 200, a collection box 300, a chamber body 400, and a rotating mechanism 700. The collection box 300, chamber body 400, and rotating mechanism 700 are all mounted on the housing 100. The housing 100 houses a control chip that manages the control system. The bottom of the housing 100 has a discharge hole corresponding to the collection box 300, allowing cat litter to fall into the collection box 300 through this hole. The housing 100 is made of high-strength engineering plastic. Four support legs 200 are positioned around the bottom of the housing 100 to provide support. Each support leg 200 is equipped with a weight sensor 201 at its base, preferably a piezoelectric sensor, which can accurately detect whether a cat is standing on the litter box and when it leaves based on changes in gravity. When the weight sensor 201 detects the cat's departure, it sends a signal to the control system to activate the rotating mechanism 700, which drives the chamber body 400 to rotate for waste removal. The weight sensor 201 can also detect if a cat accidentally enters during operation, stopping the rotating mechanism 700 if significant weight changes occur. Additionally, the cat's weight can be measured during use, with the data transmitted and displayed on a mobile app.

Figure 13:
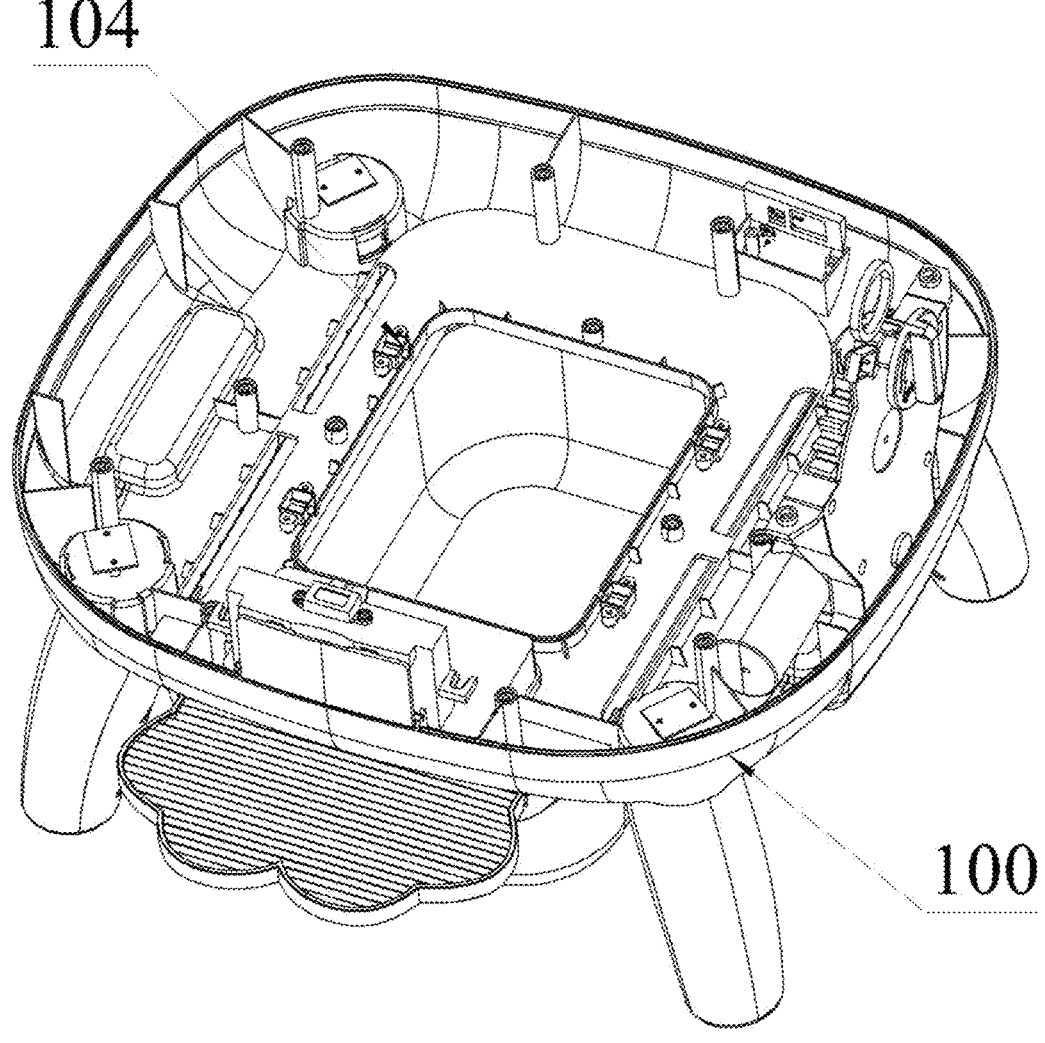
FIG. 13 is a structural schematic diagram of the infrared tube in the embodiment shown in FIG. 1.
Figure 14:
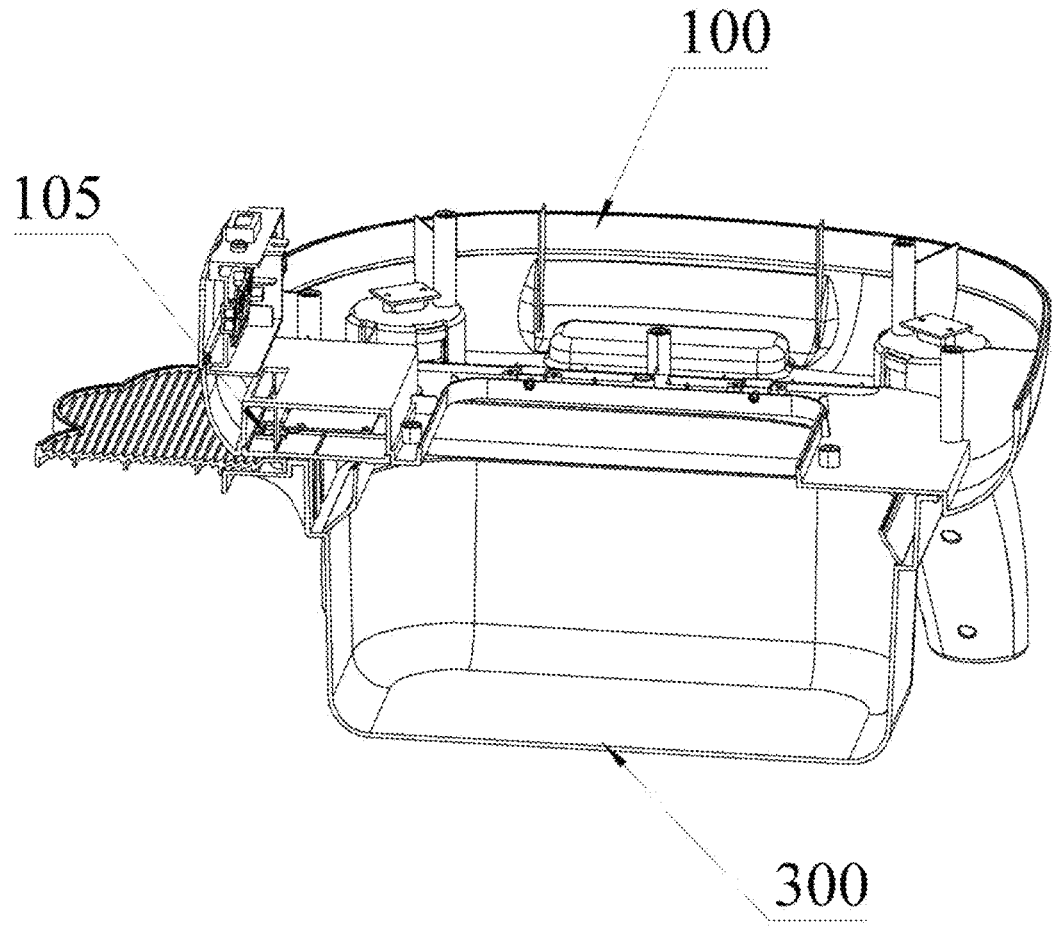
FIG. 14 is a schematic structural diagram of the first Hall switch in the embodiment shown in FIG. 1.

As shown in FIGS. 13 and 14, the interior of the housing 100 is equipped with a first Hall switch 105. When the first Hall switch 105 detects that the collection box 300 is not mounted at the bottom of the housing 100, the cat litter box will not operate, preventing contamination of the ground by cat waste due to the absence of the collection box 300. The inner bottom wall of the housing 100 is provided with four infrared tubes 104, divided into two groups located on either side of the discharge hole. These tubes emit and receive signals to detect foreign objects in the discharge hole. If an obstruction is detected, the cat litter box stops functioning to prevent cats from falling or getting injured.

As shown in FIG. 2, the bottom of the housing 100 is provided with a sliding groove 103, allowing the collection box 300 to be slidably mounted at the bottom of the housing 100. One end of the collection box 300 is equipped with a pulling plate 301, making it convenient for users to slide the collection box 300 out for cleaning. The collection box 300 is made of biodegradable plastic material for environmentally friendly disposal.

As shown in FIG. 7, the interior of the housing 100 on the side of the pulling plate 301 is equipped with a radar sensor 101, preferably an infrared pyroelectric sensor, capable of detecting the presence of living beings approaching. When the rotating mechanism 700 is in operation, if the radar sensor 101 detects a cat approaching, the control system halts the rotating mechanism 700. The mechanism resumes its unfinished task 90 seconds after the cat leaves.

As shown in FIGS. 3 to 6, the chamber body 400 is rotatably mounted inside the housing 100 via the rotating mechanism 700. The inner wall of the chamber body 400 is fixed with a baffle 406, forming an accommodation cavity 407 between the baffle 406 and the inner wall to hold clean cat litter. The bottom of the baffle 406 is equipped with a plurality of clamping hooks 404, which pivotally secure a rotating rod 403. The bottom of the rotating rod 403 is fitted with a filter screen 405 that rotates along with the rod. One end of the baffle 406 has a first magnet 408, while the end of the filter screen 405 adjacent to the first magnet 408 has a second magnet 409, with opposite polarities. When the chamber body 400 rotates, the cat litter moves with it, pushing the filter screen 405 toward the accommodation cavity 407, enabling the second magnet 409 to adhere to the first magnet 408 and fixing the filter screen 405 in place.

Figure 3:
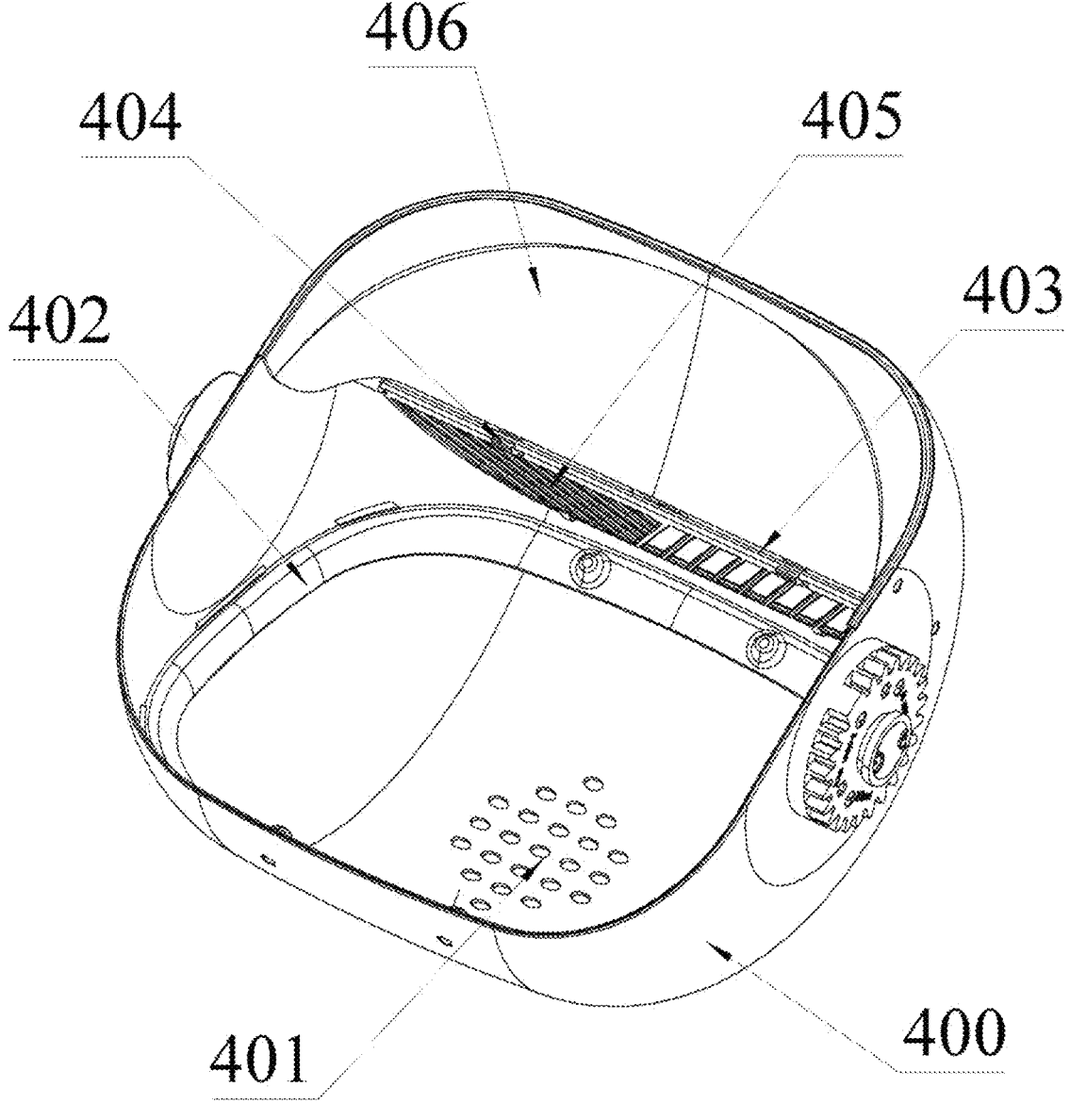
FIG. 3 is a structural schematic diagram of the chamber body in the embodiment shown in FIG. 2.
Figure 4:
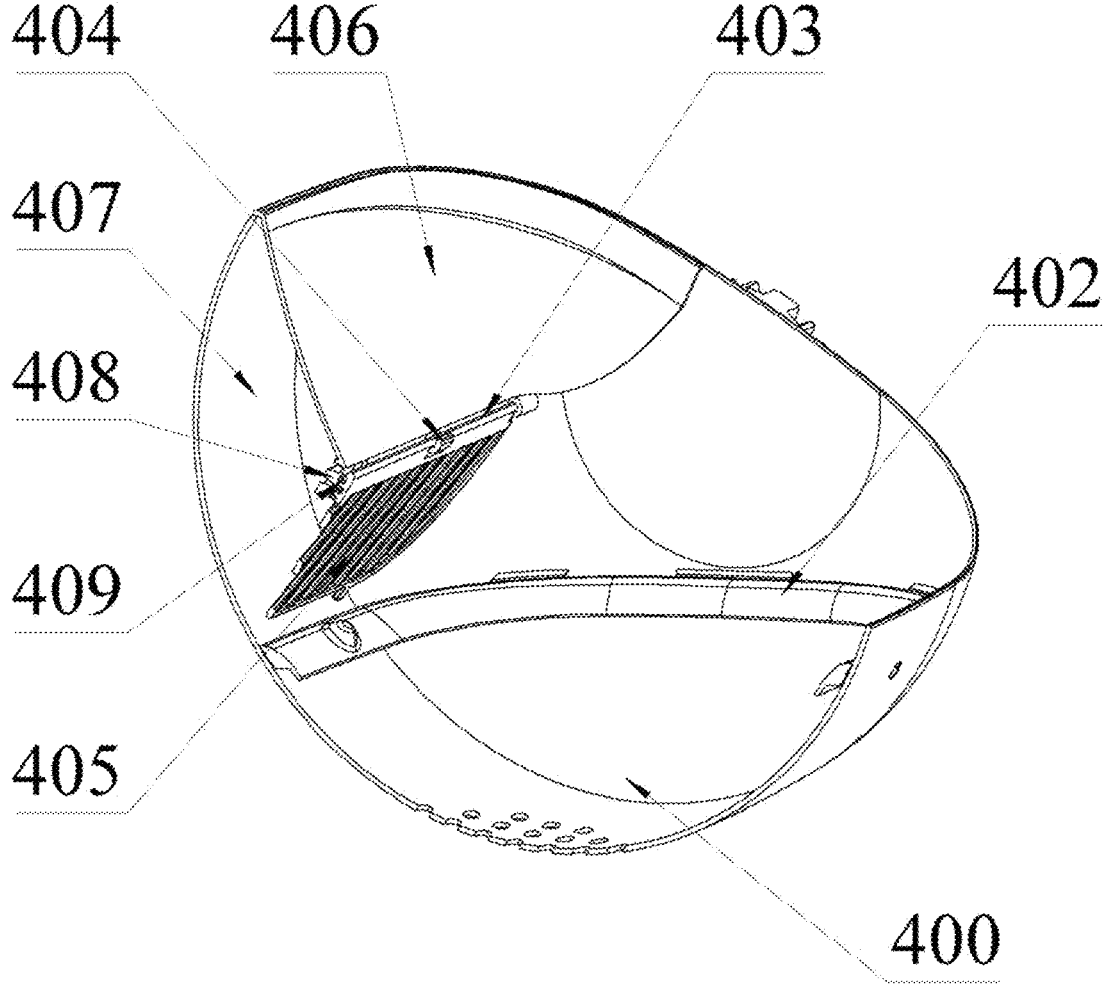
FIG. 4 is a cross-sectional schematic diagram of the chamber body in the embodiment shown in FIG. 3.
Figure 5:
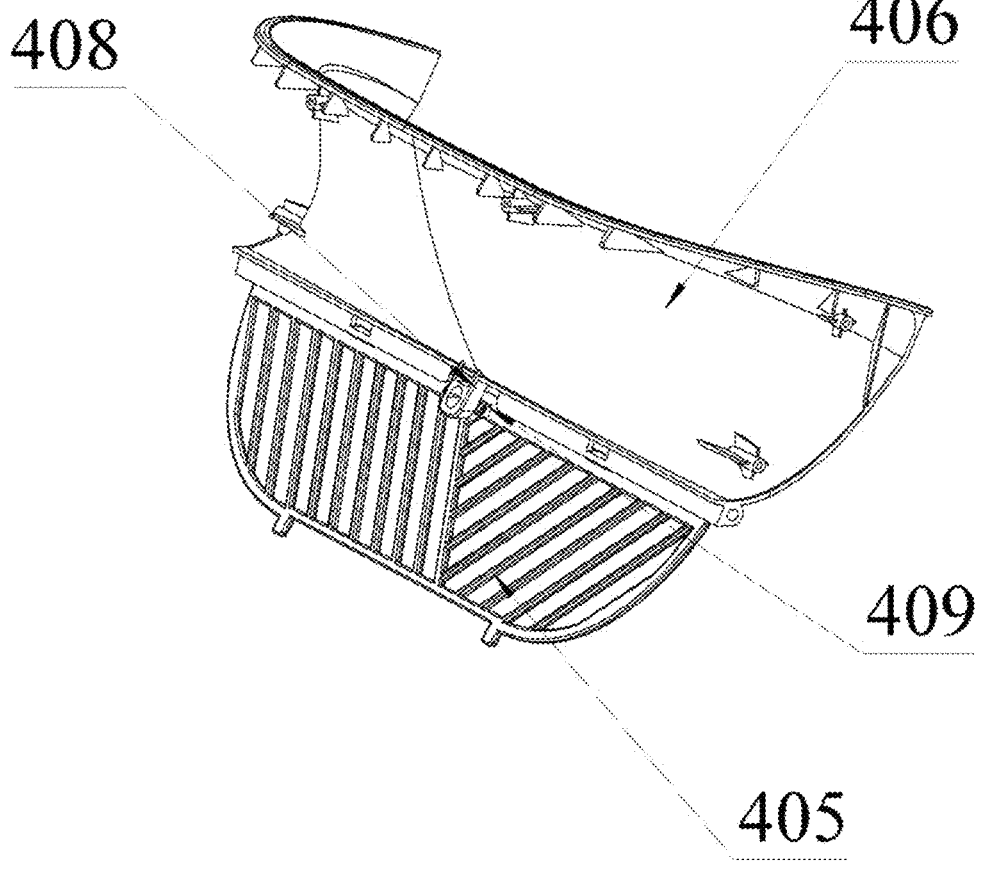
FIG. 5 is a perspective schematic diagram of the filter screen, baffle, first magnet and second magnet in the embodiment shown in FIG. 4.
Figure 6:
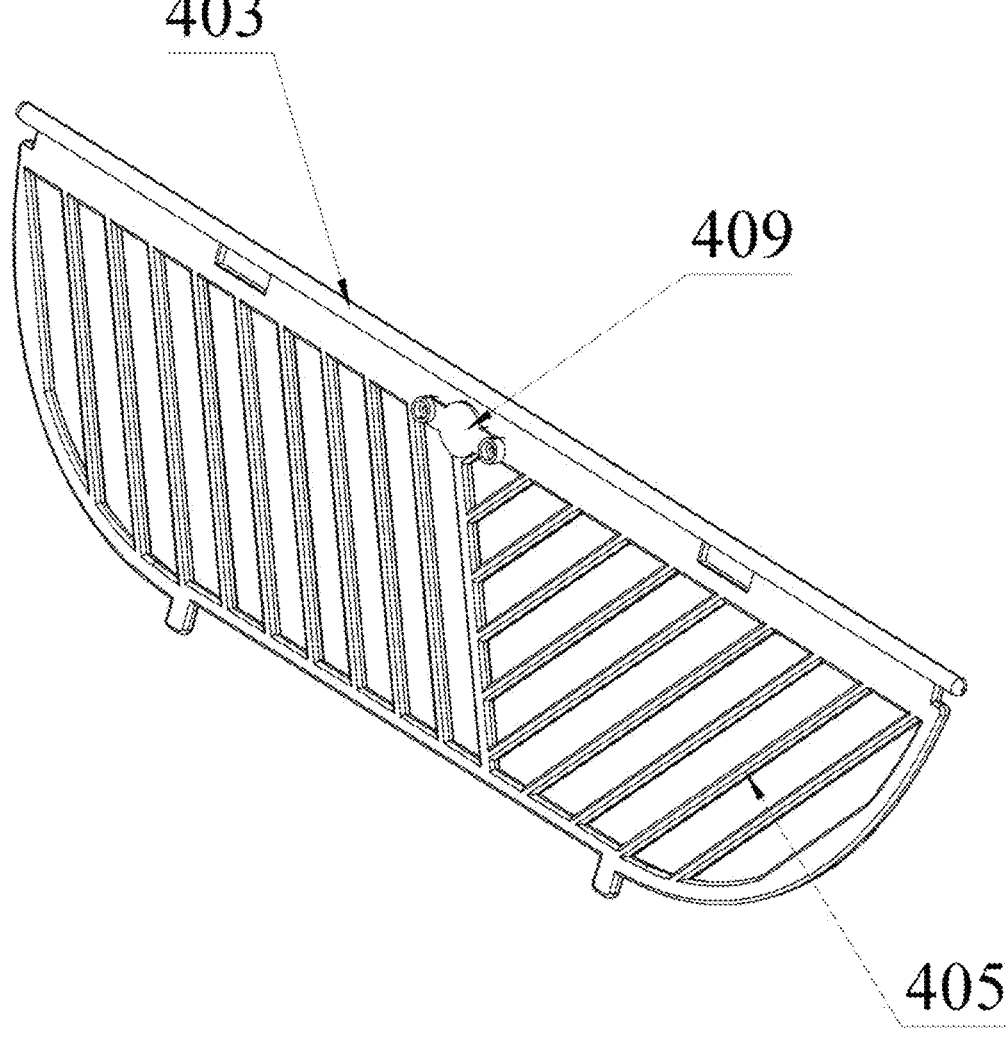
FIG. 6 is a connection schematic diagram of the rotating shaft and filter screen in the embodiment shown in FIG. 5.

As shown in FIGS. 3 and 4, the chamber body 400 has a detachably snapped mounting rack 402 inside. When the litter box is needed, first remove the mounting rack 402 from the chamber body 400, then lay the three-proof fabric inside the chamber body 400, and reattach the mounting rack 402 to the chamber body 400 to secure the three-proof fabric. Finally, pour the cat litter onto the three-proof fabric. The bottom of the chamber body 400 is equipped with a plurality of through holes 401, which allow small particles inside the chamber body 400 to fall into the collection box 300 below for gathering.

When cleaning cat waste is required, the chamber body 400 rotates clockwise, enabling the cat litter to push the filter screen 405 toward one side of the accommodation cavity 407. This makes the second magnet 409 on the filter screen 405 and the first magnet 408 on the baffle 406 attract each other, thereby securing the filter screen 405. At this point, the cat litter enters the accommodation cavity 407 during rotation, while clumped litter is blocked by the filter screen 405 outside the accommodation cavity 407. When the chamber body 400 rotates to a certain angle, the clumped litter moves along the filter screen 405 and falls into the collection box 300. Subsequently, the chamber body 400 begins rotating counterclockwise, and the cat litter pushes the filter screen 405 to rotate, enabling the second magnet 409 to move away from the first magnet 408, allowing the litter to return to the middle of the chamber body 400. This design ensures the filter screen 405 does not obstruct the movement of the litter, and elongated particles in the litter do not get stuck in the filter screen 405. When the chamber body 400 rotates sufficiently, all the litter moves into the chamber body 400 and accumulates at its front. Finally, the chamber body 400 rotates clockwise by a certain angle, spreading the litter evenly inside for reset, making it convenient for the cat to continue using it. During clockwise rotation, the filter screen 405 also rotates, enabling the first magnet 408 and the second magnet 409 to attract and secure the filter screen 405, preventing it from interfering with the cat's use.

Figure 8:
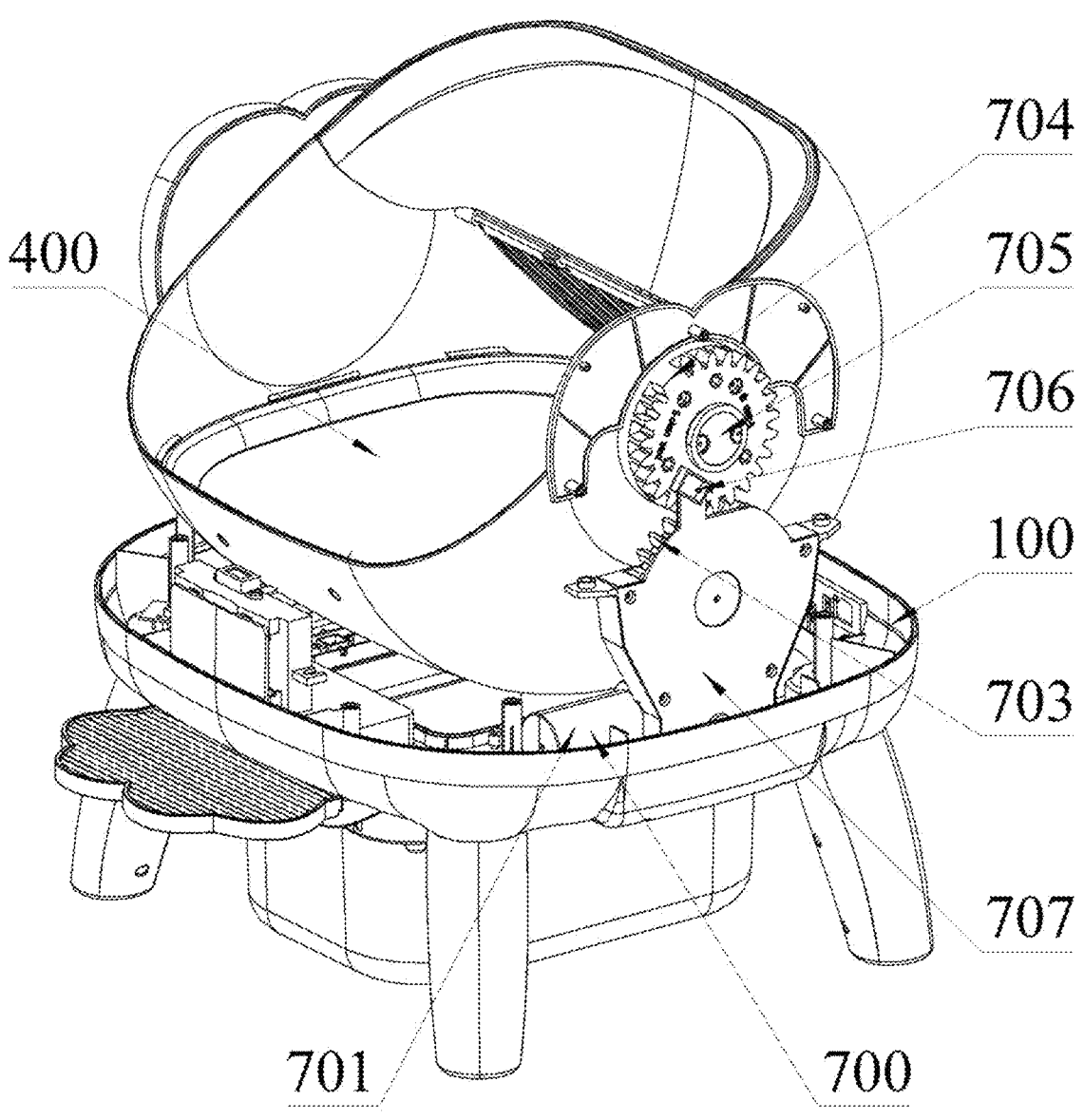
FIG. 8 is a structural schematic diagram of the rotating mechanism in the embodiment shown in FIG. 1.
Figure 9:
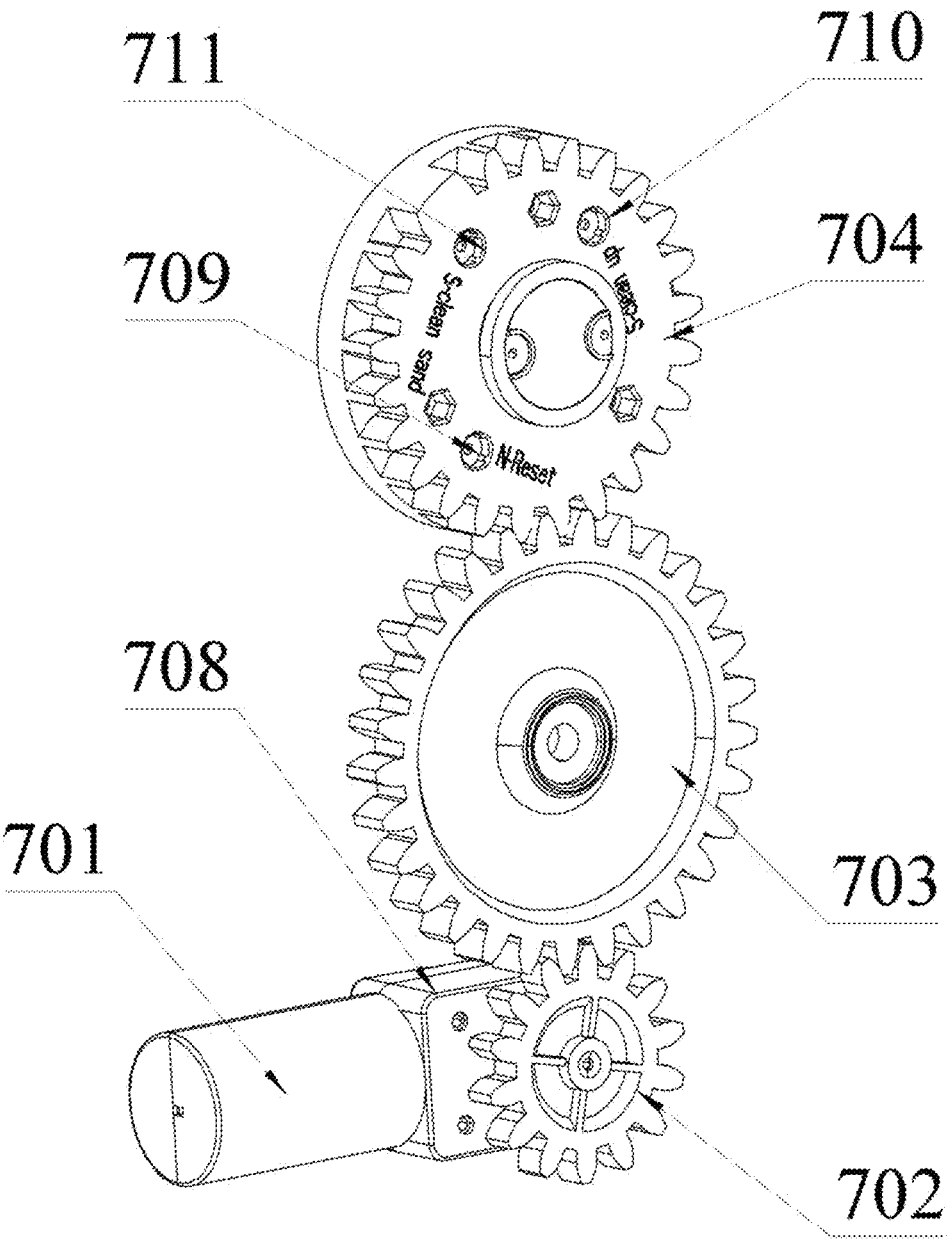
FIG. 9 is a perspective schematic diagram of the motor, first gear, second gear and third gear in the embodiment shown in FIG. 8.

As shown in FIGS. 8 and 9, the rotating mechanism 700 includes a support frame 707 vertically mounted at the bottom of the inner wall of the housing 100. One side of the support frame 707 is equipped with a transmission box 708, whose input end is fitted with a servo motor 701. The output terminal of the transmission box 708 is connected to a first gear 702, which is rotatably mounted inside the support frame 707. A second gear 703, meshing with the first gear 702, is also rotatably connected within the support frame 707. Both ends of the chamber body 400 are fitted with rotating shafts 705, allowing the chamber body 400 to rotate relative to the housing 100. On the outer side of the rotating shaft 705 adjacent to the second gear 703, a third gear 704 is mounted, which meshes with the second gear 703. The transmission box 708 is designed for high torque and low speed, enabling the servo motor 701 to reduce the rotation speed of the first gear 702 and the chamber body 400, thereby enhancing safety. When the servo motor 701 operates, it drives the first gear 702 to rotate via the transmission box 708. The first gear 702 then drives the second gear 703 to rotate, which in turn rotates the third gear 704 and the rotating shaft 705, thereby rotating the entire chamber body 400. This mechanism adjusts the angle of the chamber body 400, facilitating its defecation or litter-discharging operations.

As shown in FIGS. 8 and 9, the support frame 707 is equipped with an angle Hall plate 706, while the third gear 704 features a N pole 709, a first S pole 710, and a second S pole 711. The angle Hall plate 706 has two second Hall switches, one of which identifies the N pole 709, and the other identifies the first S pole 710 and the second S pole 711. Here, the N pole 709 serves as the standby reset. When waste removal is required, the servo motor 701 activates, enabling the third gear 704 to rotate clockwise. After the second Hall switch aligns with the first S pole 710, the third gear 704 rotates counterclockwise. Once the second Hall switch aligns with the N pole 709, it continues rotating by 10-20° before stopping. The third gear 704 then rotates clockwise again. When the second Hall switch aligns with the N pole 709, the servo motor 701 stops, keeping the chamber body 400 in its initial position to complete waste removal. For litter cleaning, the servo motor 701 activates, rotating the third gear 704 counterclockwise. During this rotation, cat litter passes through the chamber body 400 and exits via the discharge hole into the collection box 300. When the second Hall switch aligns with the second S pole 711, the servo motor 701 drives the third gear 704 to rotate clockwise. Once the N pole 709 aligns with the second Hall switch, the servo motor 701 stops, maintaining the chamber body 400 in its initial position to complete litter cleaning.

Figure 10:
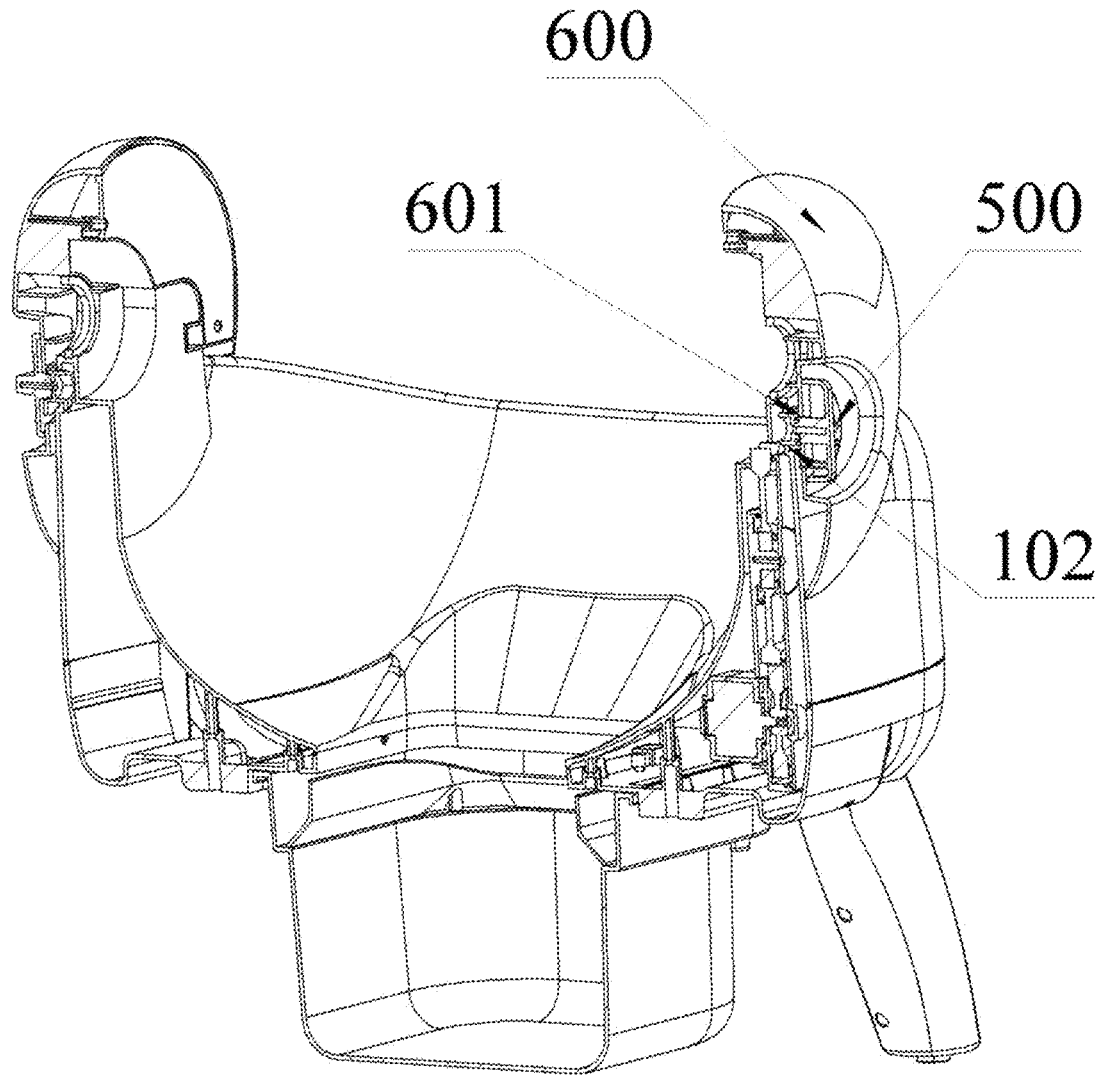
FIG. 10 is a cross-sectional structural schematic diagram of the knob in the embodiment shown in FIG. 1.
Figure 11:
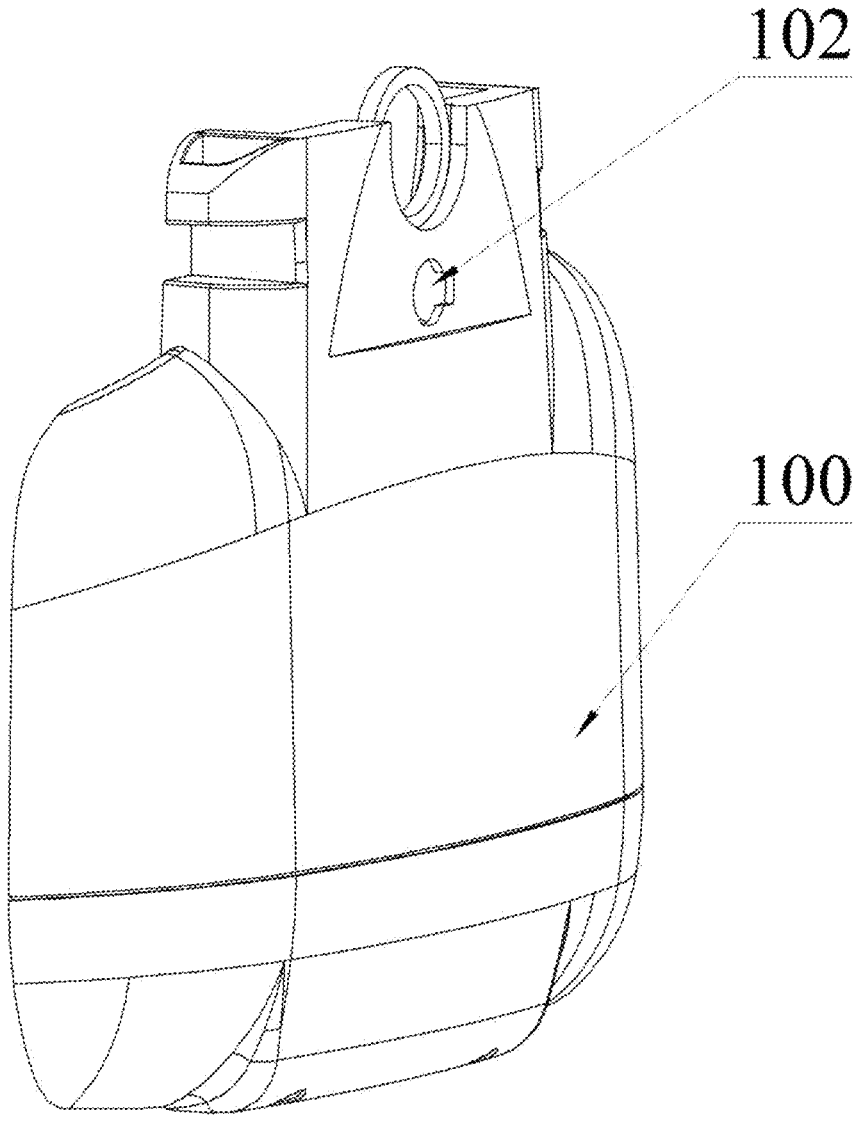
FIG. 11 is a structural schematic diagram of the housing and mounting hole in the embodiment shown in FIG. 1.
Figure 12:
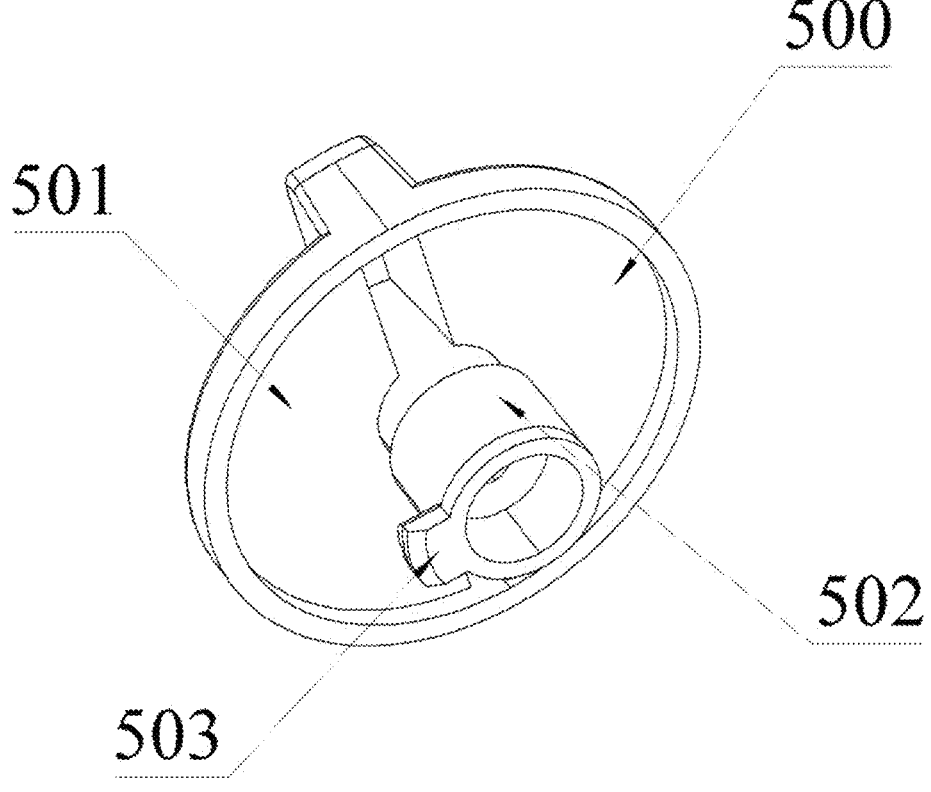
FIG. 12 is a perspective schematic diagram of the knob in the embodiment shown in FIG. 1.

As shown in FIGS. 10 to 12, both ends of the housing 100 are equipped with connecting shells 600, each of which has a connecting hole 601 on one side. Both ends of the housing 100 also feature mounting holes 102 corresponding to the connecting holes 601. The knob 500 is inserted through the connecting hole 601 into the mounting hole 102 and then rotated to secure the connecting shell 600 to the housing 100. The knob 500 consists of a turntable 501, a connecting rod 502 and a clamping block 503, with the turntable 501 and clamping block 503 positioned at two ends of the connecting rod 502 respectively. During installation, after placing the connecting shell 600 onto the housing 100, the connecting rod 502 is inserted through the connecting hole 601 into the mounting hole 102. The turntable 501 is rotated to allow the connecting rod 502 to turn the clamping block 503, pressing it against the inner wall of the housing 100 to secure the connecting shell 600. When the chamber body 400 needs disassembly for cleaning or maintenance, it simply needs to rotate the knob 500 and remove it to allow the connecting shell 600 to be detached, enabling the chamber body 400 to be taken out of the housing 100 with ease.

In other embodiments (not shown), the weight sensor 201 retains the piezoelectric sensor but incorporates a temperature compensation circuit to improve measurement accuracy under varying environmental temperatures. The support leg 200 embeds a wireless communication module (e.g., Wi-Fi or Bluetooth) for real-time weight data upload to a cloud server, enabling remote monitoring. The radar sensor 101 is replaced with a Doppler radar sensor, which not only detects approaching living beings but also distinguishes cats from other small animals (e.g., insects) by analyzing movement speed, reducing false triggers. A new visual sensor is added: a miniature camera mounted on top of the housing 100, utilizing a low-power CMOS image sensor paired with infrared LED lights for operation in low-light conditions.

The visual sensor detects the cat's entry and exit status via image recognition algorithms and cross-validates with data from the weight sensor 201. The control system employs an edge computing module integrated with sensor data fusion algorithms. When the weight sensor 201 detects the cat's departure, the system cross-verifies with the visual sensor's image data, confirming the cat has fully exited before activating the rotating mechanism 700. During the cat's use of the litter box, the weight sensor 201 monitors weight changes in real time, while the visual sensor continuously captures images inside the chamber. After the cat leaves, the weight sensor 201 sends a signal, but the control system waits for the visual sensor to confirm no cat is present (e.g., detecting the disappearance of moving objects via background subtraction algorithms) before initiating the rotating mechanism 700. If the radar sensor 101 detects rapid approach (e.g., a cat jumping back) during the cleaning process, the system immediately halts the rotating mechanism 700 and resets the chamber body 400. Additionally, the visual sensor identifies the cat's excrement state through image analysis, determining whether to intensify the cleaning cycle (e.g., diarrhea alerts) and pushing data to a mobile app. Multimodal sensor fusion (weight, radar, and vision) significantly enhances safety, preventing accidental activation due to single-sensor false alarms. The inclusion of the visual sensor enables smarter recognition of cat behavior and provides health monitoring. Meanwhile, temperature compensation and wireless communication modules improve system stability and remote management, making it suitable for multi-cat households or commercial pet facilities.

In other embodiments (not shown), the filter screen 405 is replaced with one made of flexible metal mesh, with one side rotatably connected to the bottom of the baffle 406 via a hinge. The other end of the filter screen 405 is connected to a small stepper motor, which is fixed to the inner wall of the chamber body 400. A filter screen control module is integrated into the control system of the rotating mechanism 700 for precise control of the stepper motor's rotation angle. A pressure sensor is added inside the chamber body 400, located below the filter screen 405, to detect the load of cat litter on the filter screen 405. Meanwhile, the first magnet 408 and the second magnet 409 on the baffle 406 are removed. The rotating mechanism 700 retains the gear transmission system, but the servo motor 701 adopts an encoder motor for more precise angle control. When the chamber body 400 needs to be cleaned, the rotating mechanism 700 drives it to rotate clockwise. Simultaneously, the control system determines the amount of cat litter on the filter screen 405 based on the pressure sensor's data and activates the stepper motor: during the initial rotation phase, the stepper motor slowly pulls the filter screen 405 upward at an incline (15° from the horizontal), making it easier for the cat litter to slide toward the accommodation cavity 407; when the chamber body 400 reaches a specific angle, the stepper motor quickly resets the filter screen 405 to the horizontal position to block clumped cat litter. After cleaning is completed, the chamber body 400 rotates counterclockwise, and the stepper motor controls the filter screen 405 to vibrate slightly (through rapid reciprocating motion) to prevent cat litter particles from getting stuck. Throughout the process, the encoder motor ensures the chamber body 400's rotation angle error remains below 1°, while the pressure sensor provides real-time feedback to avoid overloading the filter screen 405. By electrically controlling the angle of the filter screen 405, a more refined cleaning process is achieved. The tilting and vibrating functions of the filter screen 405 improve cat litter separation efficiency and reduce residue. The addition of the pressure sensor allows the system to adaptively adjust cleaning intensity, extending the device's lifespan. Moreover, removing the magnet structure reduces costs and avoids magnetic force degradation, making it particularly suitable for high-frequency usage scenarios.

In summary, the present disclosure achieves the following technical effects:

When the cat leaves after using the litter box, the weight sensor 201 at the bottom of the support leg 200 detects the weight change and sends a signal to the control system, activating the rotating mechanism 700. The servo motor 701 drives the chamber body 400 to rotate via the transmission box 708 through gear transmission. During the clockwise rotation of the chamber body 400, the cat litter pushes the filter screen 405 toward the side of the accommodation cavity 407, enabling the second magnet 409 on the filter screen 405 to adhere to the first magnet 408 on the baffle 406, thereby securing the filter screen 405. At this point, the cat litter enters the accommodation cavity 407 during rotation, while the clumped litter is blocked outside the accommodation cavity 407 by the filter screen 405. When the chamber body 400 rotates to a certain angle, the clumped litter falls from the filter screen 405 into the collection box 300.

Next, the chamber body 400 begins to rotate counterclockwise, and the cat litter pushes the filter screen 405 to rotate, enabling the second magnet 409 to move away from the first magnet 408, allowing the litter to return to the middle of the chamber body 400. This design ensures the filter screen 405 does not obstruct the movement of the litter, and elongated particles in the litter do not get stuck in the filter screen 405. When the chamber body 400 rotates sufficiently, all the litter moves into the chamber body 400 and accumulates at its front. Finally, the chamber body 400 rotates clockwise by a certain angle, spreading the litter evenly inside it and resetting the chamber body 400 for the cat's next use. During this clockwise rotation, the filter screen 405 also rotates, enabling the first magnet 408 and the second magnet 409 to adhere and secure the filter screen 405, preventing it from interfering with the cat's normal use.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A removable magnetic filter device for a smart cat litter box, comprising:
   a housing;
   a chamber body arranged inside the housing and rotatably mounted on the housing;
   a baffle arranged within the chamber body, forming an accommodation cavity between the baffle and an inner wall of the chamber body;
   a filter screen rotatably mounted on the baffle;
   a first magnetic attachment component mounted on the baffle; and
   a second magnetic attachment component mounted on the filter screen, wherein the first and second magnetic attachment components are magnetically attracted to each other;
   wherein when the chamber body rotates, cat litter pushes the filter screen to turn, enabling the second magnetic attachment component to adhere to the first magnetic attachment component to secure the filter screen, thereby blocking clumped cat litter and allowing clean cat litter to enter the accommodation cavity; and
   when the chamber body rotates in reverse, the cat litter pushes the filter screen to turn reversely, separating the second magnetic attachment component from the first magnetic attachment component, and the filter screen moves with the cat litter to avoid clogging.

2. The removable magnetic filter device for a smart cat litter box according to claim 1, further comprising a rotating rod and a clamping hook, wherein the rotating rod is mounted on the filter screen, the clamping hook is mounted at a bottom of the baffle, and the rotating rod is rotatably engaged inside the clamping hook.

3. The removable magnetic filter device for a smart cat litter box according to claim 1, wherein the first magnetic attachment component is a first magnet, the second magnetic attachment component is a second magnet, and the first magnet and the second magnet have opposite magnetic polarities.

4. The removable magnetic filter device for a smart cat litter box according to claim 1, wherein a bottom of the housing is provided with a sliding groove, a collection box is slidably inserted in the sliding groove, and one end of the collection box is equipped with a pulling plate.

5. The removable magnetic filter device for a smart cat litter box according to claim 4, wherein a bottom of the chamber body is provided with a plurality of through holes for allowing fine particles to fall into the collection box below.

6. The removable magnetic filter device for a smart cat litter box according to claim 1, further comprising support legs arranged around the bottom of the housing, with weight sensors provided at bottoms of the support legs to detect whether a cat has left and trigger rotation of the chamber body.

7. The removable magnetic filter device for a smart cat litter box according to claim 1, further comprising a radar sensor mounted on the housing for stopping rotation of the chamber body when detecting approach of a living.

8. The removable magnetic filter device for a smart cat litter box according to claim 1, further comprising a rotating mechanism to drive the rotation of the chamber body, the rotating mechanism comprising a servo motor, a transmission box, a first gear, a second gear, a third gear, two rotating shafts and a support frame, wherein the support frame is mounted on an inner bottom of the housing, the two rotating shafts are respectively arranged at both ends of the chamber body, the transmission box is mounted on the support frame, the servo motor is mounted at an input end of the transmission box, the first gear is mounted on an output shaft of the transmission box, the second gear is rotatably mounted inside the support frame, the third gear is mounted on the rotating shaft, and the second gear meshes with both the first gear and the third gear.

9. The removable magnetic filter device for a smart cat litter box according to claim 1, further comprising a mounting rack detachably clamped inside the chamber body for securing three-proof fabric laid within the chamber body.

10. The removable magnetic filter device for a smart cat litter box according to claim 1, further comprising connecting shells and knobs, wherein the connecting shells are mounted at both ends of the housing, one side of each connecting shell is provided with a connecting hole, both ends of the housing are provided with mounting holes corresponding to the connecting holes, and the knobs are inserted into the mounting holes through the connecting holes.

11. The removable magnetic filter device for a smart cat litter box according to claim 10, wherein the knob comprises a turntable, a connecting rod and a clamping block, with the turntable and the clamping block respectively mounted at both ends of the connecting rod.

12. A removable magnetic filter device for a smart cat litter box, comprising:
   a housing;
   a chamber body arranged inside the housing and rotatably mounted on the housing;
   a baffle arranged inside the chamber body, forming an accommodation cavity between the baffle and an inner wall of the chamber body;
   a filter screen rotatably mounted on the baffle;
   a first magnetic attachment component mounted on the baffle;
   a second magnetic attachment component mounted on the filter screen, wherein the first magnetic attachment component and the second magnetic attachment component are magnetically attracted to each other; and
   a rotating mechanism mounted inside the housing and connected to the chamber body for driving rotation of the chamber body;
   wherein when the chamber body rotates, the cat litter pushes the filter screen to rotate, enabling the second magnetic attachment component to adhere to the first magnetic attachment component to secure the filter screen, thereby blocking clumped cat litter and allowing clean cat litter to enter the accommodation cavity; and when the chamber body rotates in reverse, the cat litter pushes the filter screen to turn reversely, separating the second magnetic attachment component from the first magnetic attachment component, allowing the filter screen to move with the cat litter to avoid clogging.

13. The removable magnetic filter device for a smart cat litter box according to claim 12 is wherein the filter screen is equipped with a rotating rod, a bottom of the baffle is provided with a clamping hook, and the rotating rod is rotatably engaged inside the clamping hook.

14. The removable magnetic filter device for a smart cat litter box according to claim 12 is wherein a bottom of the housing is provided with a sliding groove, a collection box is slidably inserted in the sliding groove, one end of the collection box is equipped with a pulling plate, and the bottom of the chamber body is provided with a plurality of through holes to allow fine particles to fall into the collection box below.

15. The removable magnetic filter device for a smart cat litter box according to claim 12, further comprising support legs arranged around the bottom of the housing, with weight sensors provided at bottoms of the support legs to detect whether a cat has left and trigger rotation of the chamber body.

16. The removable magnetic filter device for a smart cat litter box according to claim 12, further comprising a radar sensor mounted on the housing for stopping the rotation of the chamber body when detecting approach of a living being.

17. The removable magnetic filter device for a smart cat litter box according to claim 12, wherein the rotating mechanism comprises a servo motor, a transmission box, a first gear, a second gear, a third gear, two rotating shafts and a support frame, wherein the support frame is mounted at an inner bottom of the housing, the two rotating shafts are respectively mounted at both ends of the chamber body, the transmission box is mounted on the support frame, the servo motor is mounted at an input end of the transmission box, the first gear is mounted on an output shaft of the transmission box, the second gear is rotatably mounted inside the support frame, the third gear is mounted on the rotating shaft, and the second gear meshes with both the first gear and the third gear.

18. The removable magnetic filter device for a smart cat litter box according to claim 12, further comprising a mounting rack detachably engaged inside the chamber body for securing three-proof fabric laid within the chamber body.

19. The removable magnetic filter device for a smart cat litter box according to claim 12, further comprising connecting shells and knobs, wherein the connecting shells are arranged at both ends of the housing, one side of each connecting shell is provided with a connecting hole, both ends of the housing are provided with mounting holes corresponding to the connecting holes, and the knobs are inserted into the mounting holes through the connecting holes.

20. The removable magnetic filter device for a smart cat litter box according to claim 19, wherein the knob comprises a turntable, a connecting rod and a clamping block, with the turntable and the clamping block respectively arranged at both ends of the connecting rod.

\* \* \* \* \*